US005808969A

United States Patent [19]
Arnaud et al.

[11] Patent Number: 5,808,969
[45] Date of Patent: Sep. 15, 1998

[54] METHOD AND DEVICE FOR DETECTING OBJECTS DISPERSED IN AN AREA OF LAND

[75] Inventors: Philippe Arnaud, Orleans; Loic Laine, Saint Doulchard, both of France

[73] Assignee: Giat Industries, Versailles, France

[21] Appl. No.: 566,713

[22] Filed: Dec. 4, 1995

[30] Foreign Application Priority Data

Dec. 20, 1994 [FR] France .................................. 94 15337

[51] Int. Cl.⁶ ...................................................... G01S 3/80
[52] U.S. Cl. ............................ 367/103; 73/594; 73/602; 89/1.13
[58] Field of Search ............................. 367/103; 73/594, 73/598, 602, 628; 128/660.07, 660.08; 89/1.13

[56] References Cited

U.S. PATENT DOCUMENTS

| 3,815,704 | 6/1974 | Eisner . | |
|---|---|---|---|
| 5,092,336 | 3/1992 | Fink | 128/660.03 |
| 5,276,654 | 1/1994 | Mallart et al. | 367/7 |
| 5,277,117 | 1/1994 | Bender et al. | 102/402 |
| 5,307,272 | 4/1994 | Butler et al. | 364/424.02 |
| 5,428,999 | 7/1995 | Fink | 73/599 |
| 5,431,053 | 7/1995 | Fink | 73/602 |
| 5,615,174 | 3/1997 | Arnaud et al. | 367/118 |

FOREIGN PATENT DOCUMENTS

| 0 383 650 | 8/1990 | European Pat. Off. . |
| 0 591 061 | 4/1994 | European Pat. Off. . |
| 2 618 540 | 1/1989 | France . |
| 2642640 | 8/1990 | France . |
| 2696573 | 4/1994 | France . |
| 25 48 041 | 4/1977 | Germany . |
| 2 259 146 | 3/1993 | United Kingdom . |
| 90/10866 | 9/1990 | WIPO . |

*Primary Examiner*—Nelson Moskowitz
*Attorney, Agent, or Firm*—Oliff & Berridge, P.C

[57] ABSTRACT

A process and device for detecting objects, in particular mines, dispersed in an area of land. The process implements a plurality of acoustic transducers. After determination of an optimal operational frequency, a brief acoustic pulse is emitted into the ground and then successive temporal reversals of signals received by the transducers focus detection on a first object. At least two transducers for which the propagation times are roughly equal are located and at least one location direction, defined as the mean perpendicular of the segment joining the at least two transducers, is determined.

15 Claims, 8 Drawing Sheets

METHOD AND DEVICE FOR DETECTING OBJECTS DISPERSED IN AN AREA OF LAND

BACKGROUND OF THE INVENTION

The scope of the present invention is that of processes and devices allowing the detection of objects, and in particular the detection of mines dispersed over an area of land.

Mine detection processes and devices are known which use magnetic means. These devices implement a generator and a conductive coil. When a conductive material is found in the vicinity of the coil, the current flowing through the latter is disturbed and a detection signal is supplied by a processing electric circuit.

Such detection devices oblige the detection coil to be brought into the vicinity of the mine, thereby endangering the person responsible for handling the detector and thus making demining operations both long and difficult.

In addition, the detector risks being activated by magnetic objects other than the mines being searched for thereby causing false alarms which slow down the demining operations even more.

Lastly, such processes and devices are ill-adapted to the detection of modern mines which hardly use any magnetic materials.

A detection process and device are known elsewhere, notably by patent FR2696573, which are based on the principle of the temporal reversal of an acoustic wave.

This process implements a certain number of acoustic transducers (emitters/receivers) which enables an acoustic beam to be aimed, practically automatically, at an object whose exact location is unknown.

The analysis of the signals picked up after a certain number of iterations enables a wave front to be determined wherein the crest or focal point indicates the location of the object.

Such a process is particularly well-adapted to medical imagery and enables the exact location of stones or tumours in the human body to be determined.

Indeed, in this case the transducers are placed at relatively small distances from the objects to be detected (less than 200 mm) and the propagation speed of the sound waves remains roughly the same in every direction of the area to be explored.

This process is, however, ill-adapted to the detection of objects in the ground and notably in land of a large surface area (in the region of 5 to 10,000 m$^2$).

In fact, the numerous heterogeneities present over such a surface area of land will vary the propagation speed of the sound waves in great proportions, making it impossible to determine a wave front which has a crest whose position is sufficiently well defined.

SUMMARY OF THE INVENTION

The aim of the present invention is to propose a detection process which does not present such disadvantages.

The process according to the invention thus enables the detection using acoustic means of objects (in particular mines) dispersed over an area of land. Therefore, it is not affected by the type of material, magnetic or not, which make up the objects.

The process according to the invention may be implemented at a distance from the objects to be detected thereby improving the safety of the operation when the objects in question are mines.

The process according to the invention enables objects to be detected in an area of land which is very large without having to go over the land with detection means, thereby improving safety even more.

The process according to the invention also allows, when being used for mine detection, the activation or destruction of the mines by remote control.

The different devices allowing such a process to be implemented form a further subject of the invention.

These devices enable detection to be rapidly implemented, or alternatively allow detection at a reliable distance for large areas of land.

The subject of the invention is thus a process to detect objects, and in particular mines dispersed over an area of land, a process characterised in that it implements a multiplicity of acoustic transducers and in that the following stages are carried out:

an optimal operational frequency is firstly determined for the transducers in accordance with the type of ground, a frequency which gives a received signal amplitude which is at its maximum for the majority of the transducers when emitted by one of them;

a brief and unfocused initial pulse is sent into the ground by at least one transducer at this optimal frequency;

the echo signals returned by the ground and received by the transducers are recorded, each echo signal being memorized according to time, the start time being the instant of sending the initial pulse;

by using at least one temporal window, the echo signals coming from a first object located in the area of land are selected;

k successive temporal reversals of the signals received by the transducers are carried out so as to focus detection on the first object and the reflected signals are memorized at the end of the last temporal reversal;

the transducers having roughly the same propagation time are then looked for; and at least one direction, called the location direction, is determined in which the first object lies, a direction defined as the mean perpendicular of the segment joining two transducers for which the propagation time is roughly the same.

According to a first embodiment of the invention, a position is determined for the first object along its location direction by calculating the distances travelled by the reflected waves received by the transducers which define the location direction.

According to a second embodiment of the invention, the acoustic transducers are arranged along at least two converging lines and in that the location of the first object is determined as being the intersection point or area of at least two location directions.

According to an alternative embodiment, after receiving the echo signals the first object to processed by temporal reversal is chosen by analysing the wave shapes according to the different return echos received by each transducer followed by the comparison of these wave shapes against a library of the characteristic signatures of the main objects to be detected.

According to another alternative, the first object is identified after carrying out the k temporal reversals by analyzing the wave shapes according to the different echo signals received by each transducer and comparing these wave shapes with a library of characteristic signatures of the main objects to be detected.

According to another alternative, after locating and selecting a first object, at least one other acoustic signal is emitted to the latter having the shape of that memorized after the last temporal reversal, an amplified signal of sufficient intensity to make the object move or vibrate.

A further subject of the invention is also a device to detect objects, and in particular mines dispersed in an area of land, a device which implements such a process and which is characterized in that it comprises at least one row of acoustic transducers connected to processing electronics, each transducer being carried by a support designed to be buried in or applied on the ground.

The detection device can comprise at least one row of aligned supports or at least two rows of supports arranged along converging lines.

The supports can be integral with at least one ramp carried by at least one vehicle, a ramp whose position can be adjusted in order to allow the supports to be positioned with respect to the ground.

Each row of supports can be carried by a different vehicle.

The supports can be installed individually on the land, a radio link being provided in that case between each support and at least one part of the processing electronics so as to allow the synchronization of pulses emitted by the transducers.

BRIEF DESCRIPTION OF THE DRAWINGS

The invention will be better understood after reading the description of the particular embodiments, a description which is made with reference to the appended drawings in which.

DESCRIPTION OF PREFERRED EMBODIMENTS

Figure 1:
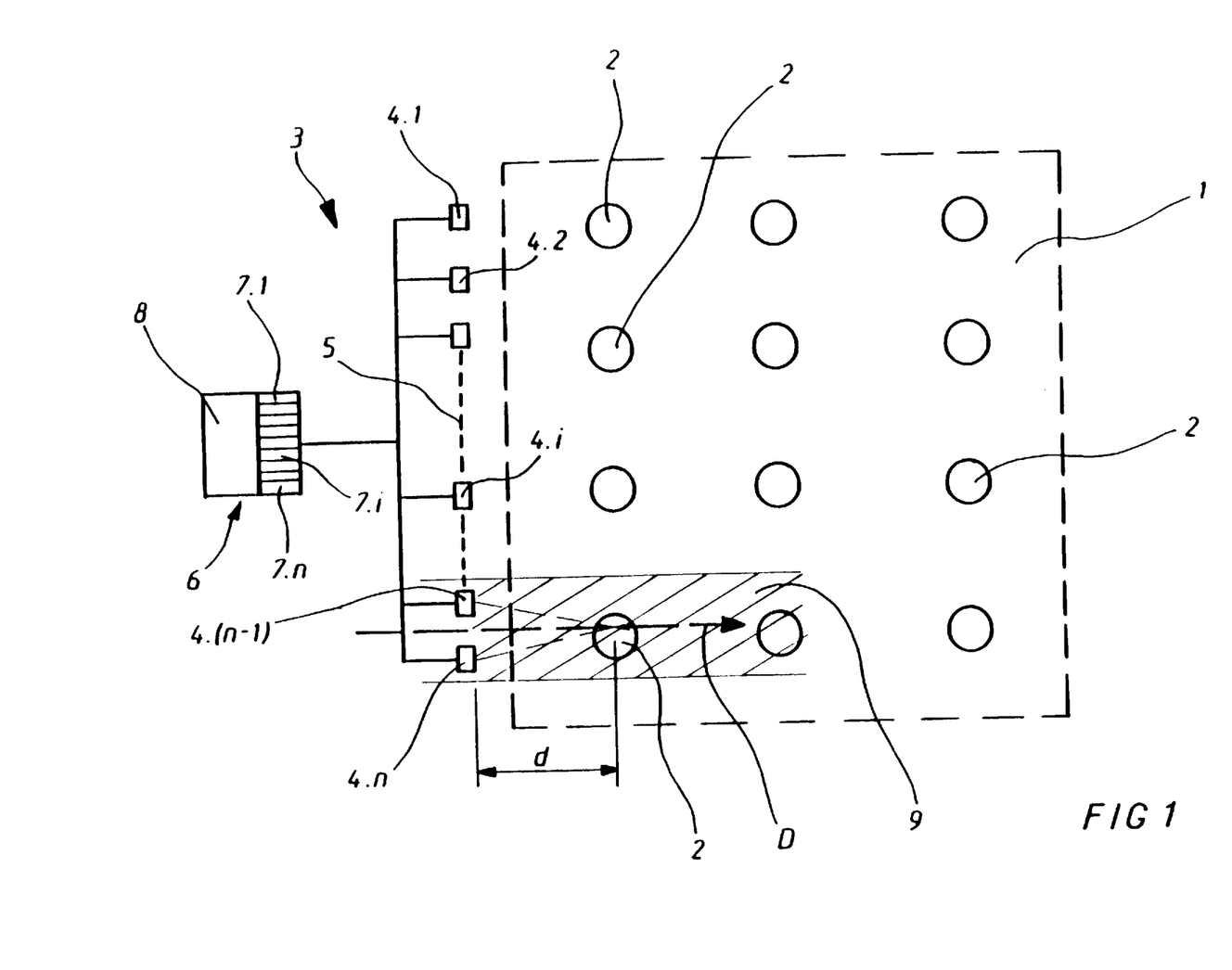
FIG. 1 shows in diagram form an area of land dispersed with objects to be detected and in the vicinity of which a detection device according to the invention has been placed.

With reference to FIG. 1, an area of land 1, marked out here by dotted lines, contains a certain number of objects 2, which are buried mines.

A detection device 3 according to a first embodiment of the invention comprises a certain number of acoustic transducers distributed along a line 5 (the different transducers are numbered 4.1, 4.2, . . . 4.i, 4.n).

The transducers are constituted in a conventional manner by piezoelectrical ceramic plates or by electromagnetic transducers.

The transducers will be separated from one another by a distance of 200 mm to 1 m. Spacing will advantageously be chosen such that the value is around the same as the largest size of the mines or objects to be detected.

In certain applications (which will be detailed later on) relatively wide spacing can be adopted (of around 1 to 5 m) and this in order to carry out a quick search for mines over a large area of land (up to 100 m×100 m).

The transducers are arranged so as to be able to emit and receive acoustic waves in the ground. They are carried, for example, on supports in the shape of pegs which enable them to be installed at an optimal depth (for example, the usual depth at which mines are laid, i.e. from 200 to 300 mm).

The transducers could also be carried on supports which are merely placed on the ground. In this event, the support ensures that the transducer remains flat against the ground. The acoustic waves are therefore emitted on the surface but they propagate, nevertheless, through a layer of ground which is around 200 to 300 mm in depth, thereby enabling the detection of mines which are usually buried at such depths.

The transducers 4.1 to 4.n are connected to an electronic processing box 6 which comprises a certain number of bands 7.1, 7.2, . . . 7.i, 7.n (one band per transducer) and a common control unit 8.

Following the process proposed by the invention, an optimal operational frequency for the transducers will first of all be determined.

This frequency depends on the type of ground in which the mines are placed.

To determine this frequency an unfocused frequency will be applied (for example, by means of a wobbling frequency generator) to a single transducer, preferably the one positioned in the middle of the line 5, and the signals received by the other transducers will be analyzed according to the frequency emitted.

A working frequency will be retained for which the amplitude of the signals received by the transducers is at its maximum for the majority of the transducers (at least 50% of them).

In concrete terms, the operational frequencies mostly vary between 10 Hz and 100 kHz according to the type of ground.

Once the operational frequency has been determined, a brief and unfocused pulse at this frequency is sent into the ground of the area of land in question by at least one transducer.

The conventional method of focusing the sound waves by signal temporal reversal is thereafter applied.

This method is known to the expert and is notably described in patents FR2642640 and FR2696573, it will therefore not be described here in detail.

The method consists in:

recording the echo signals returned by the land and received by all the transducers, each return signal being memorized according to time, with the instant of emission of the initial pulse as the starting time;

selecting, by means of a temporal window, the echo signals coming from a first mine 2 located in the area of land;

carrying out k successive temporal reversals for signals received by the transducers so as to focus detection on the first mine; and memorizing the reflected signals at the end of the last temporal reversal.

In concrete terms, at least 5 temporal reversals will be carried out in order to ensure sufficient focusing.

The number of temporal reversals (even or odd) depends on the type of ground, an odd number of temporal reversals may be preferred so as to have a symmetrical wave front from the signals obtained.

It is considered that the focusing obtained is sufficient when the echo returned from a target stands out clearly from the others, for example, when its amplitude is at least three times greater than that of the others.

After this last stage the wave front received from the ground doesn't have an even enough curve to be able to determine a center or focal position for the mine.

In accordance with the process according to the invention, transducers are located for which the measured propagation times are roughly the same.

Transducers fulfilling this condition which are next to each other on line 5 will advantageously be chosen. Such a choice enables locating accuracy to be improved. Indeed, when the transducers are near to one another, the propagation speeds in the ground are roughly the same for the signals received by these two transducers.

The equality of propagation times will, for example, be assessed by comparing the signals two by two and by choosing two transducers which have the smallest gap between echos. In concrete terms, the differences will be made between the signals, two by two, and those which present the smallest difference will be chosen.

After this a direction D is determined, called the location direction, along which, in theory, the first mine is to be located. This direction is defined as the mean perpendicular of a segment joining two transducers for which the propagation times are roughly equal.

Each propagation time is measured by the control unit 8 as the time gap which separates, for any given transducer, the outward signal and the echo return corresponding to the mine.

With reference to FIG. 1, a location direction D has been illustrated which corresponds to the mean perpendicular between transducers 4.(n–1) and 4.n. In fact, the mine is not obligatorily along direction D but it may be found in a band 9 (hatched) which is perpendicular to the distribution line 5 of the transducers. This band is centered on direction D and its width is equal to double the distance which separates the transducers.

In a practical manner, the mine will be considered to be along direction D and/or in the band 9 and at a distance from line 5 which is determined as half the ratio of the propagation speed of the sound wave in the ground to the propagation time.

In order to make this calculation, the propagation speed in the ground will be assessed by a specific measurement. For example, a measurement made at the first stage during the determination of the optimum working frequency. In fact, during this stage it is easy to make the different ratios between the distances between the emitting transducer and each receiving transducer and the propagation times measured.

The propagation speed thus assessed may be chosen as a mean value of the different propagation speeds measured.

The position of the mine along direction D can also be determined by calculating the intersection point of the circles centered on each of the two transducers in question, circles whose diameters will be calculated as equal to the ratio of the propagation speed of the sound wave in the ground to the propagation time measured for the transducer in question.

This mode of calculation is more accurate when the transducers retained are not contiguous.

The principle behind the choice of a temporal window is disclosed in the aforementioned documents. It consists in only re-emitting during the temporal reversal those signals coming from a certain area of the land in which there may possibly be a mine.

In a conventional manner, the temporal window is chosen from the first echo signal received by the device. As a general rule, those signals surrounding certain maximums noted on the echos are returned, the maximums theoretically corresponding to a wave reflected by an object.

Given the size of the land to be explored, the objects nearest to the transducers will firstly be examined, the temporal window will therefore ignore the echos coming from more remote objects.

The wave shapes which follow the different return echos received by each transducer may advantageously be analyzed and compared with a library of characteristic signatures of the main types of mine to be detected.

Such a library is easy to set up by carrying out the calibration of the device on a terrain which is known and in which are buried one after the other the different known types of mine which may have to be detected.

The comparison of the wave shapes with those of the signature library will preferably be carried out by means of neuronal circuits. Such circuits are known to the expert and they allow the rapid calculation of shape recognition. The advantage of employing the iterative process of signal temporal reversals enables the signal to be focused on one mine in particular. Parasite signals are thus eliminated and location accuracy by the transducers is improved. It becomes easy to isolate at least two contiguous transducers for which the propagation time is roughly equal.

After carrying out k temporal reversals, a second identification of the mine can be made with a higher degree of accuracy.

To do this a comparison will be made once again of the wave shapes following the different echo signals received by each transducer with a mine signature library.

Figure 3:
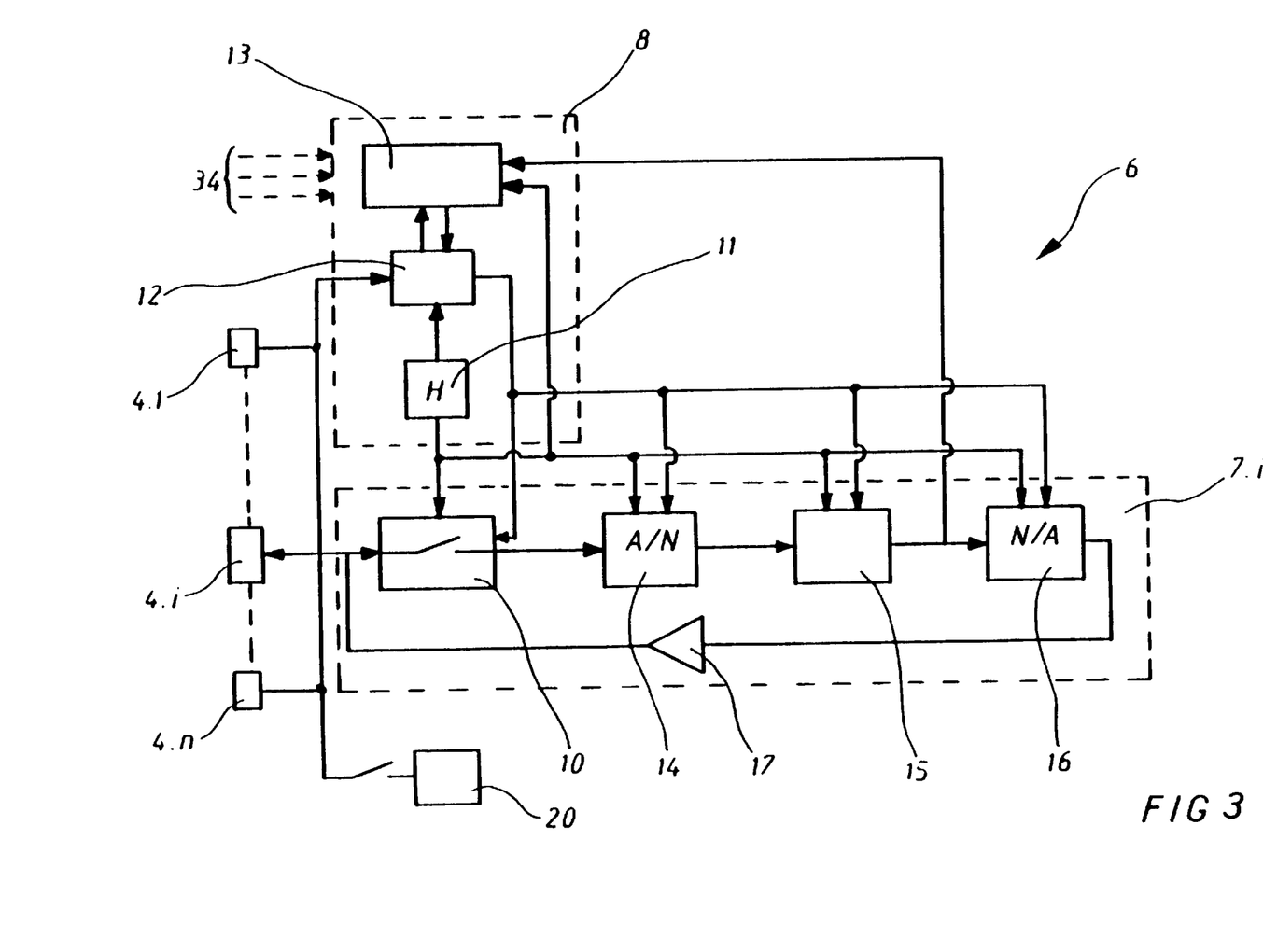
FIG. 3 is a flow chart of the processing electronics corresponding to the device according to the invention.

FIG. 3 shows an embodiment of an electronic processing box 6 enabling the above process to be implemented. This processing electronics comprises the processing bands 7.1, . . . , 7.i, . . . , 7.n and a common control unit 8.

Each transducer 4.1 is associated with one processing band 7.i (only one band is shown here). Each band 7.i comprises a sampler 10 which is designed to supply analog samples of the signal received by the transducer 4.i at the frequency of a clock 11 of the control unit 8. The sampling frequency given by the clock will depend on the optimal working frequency. It will preferably be above R/dxV, expression in which R is the resolution or the number of points of the signal (100, for example), d is the main dimension of the smallest object to be detected and V the mean propagation speed of the waves in the ground.

The time lapses during which the sampler works are determined by a rate setter 12 (also integral with the control unit 8). The rate setter enables a temporal window to be defined in which the echo signals will be examined by the different samplers. The duration of the temporal window will be chosen long enough so that each transducer can receive a return echo corresponding to the mine.

In a known manner, this temporal window is determined after receiving the first echo signals, in such a way as to encompass and the required maximums which correspond to the first mine.

In the event that the distance between the furthest apart transducers (1 and n) is very large (over 50 m), it will be possible to define different temporal windows for several groups of transducers so as to give each window a width which is restricted enough to be able to eliminate non-required echos and improve focusing.

The temporal window or windows will be chosen by the user by acting on the rate setter 12 by means of a computer 13 (also integral with the control unit 8) which is fitted with a suitable interface for the user (keyboard, screen, etc).

For a given band 7.i, the sampler 10 is followed by an analog/digital converter 14. As a general rule, a conversion over ten bits is enough to show the echos in a satisfactory manner. The words which are representative of a sample are stored in a memory bank 15, organized in the form of a stack (of the last in—first out type).

The capacity of this memory bank will be chosen big enough to store all the samples received during the duration of the temporal window.

The rate setter 12 is also provided to cause the emission of a wave front returned after a brief period of time after receiving the received echo (a few milliseconds).

Each band 7.i comprises a digital/analog converter 16 to enable re-emission, possibly followed by an amplifier 17 whose output drives the associated transducer 4.i.

An exciting circuit 20 enables a brief and unfocused initial pulse to be applied to one or several transducers at the optimal frequency.

This exciting circuit can also be used to determine tho optimal working frequency.

The circuit 20 is shown connected to all the transducers. In fact, means (not shown) are provided to connect it to one or several transducers at the user's discretion.

Such an electronic processing box 6 is disclosed in patents FR2642640 and FR2696573.

The computer 13 will be connected to all the bands 7.i associated with the different transducers. The same applies to the clock 11 and the rate setter 12. The synchronization of all the different bands being essential to the service quality of the focusing device by temporal reversal of the echos. The connections joining the control unit 8 to the different processing bands 7.i is shown in reference 34.

The computer 13 compares the signals received against the mine library and it will therefore comprise the memory banks containing the signature library as well as the required neuronal circuits.

The computer 13 also determines (after carrying out the temporal reversals) the transducers having the same return times. It defines thereafter the location direction and/or the location band.

It computes the distance d at which the mine is likely to be found. A display monitor can facilitate the utilization of the data by the user (visualization of directions and/or bands as well as the theoretical location of the mines).

After detection and location of a first mine, the process according to the invention is reiterated so as to detect and locate another mine. Another temporal window will be chosen for this.

After at least four mines have been pin-pointed, it will be possible to seek to locate the presence of a laying pattern for these first four mines, i.e. a simple mesh which is usually regularly repeated over the ground when the mines are buried.

Determining this laying pattern will help to increase the detection speed for the other mines by allowing the quick definition of the temporal windows which correspond to areas of land in which a mine may theoretically be found if the mesh is exact.

It is thus possible to define an algorithm to explore the land which will enable an image of the dispersion of the mines over the area of land to be rapidly obtained.

Figure 2:
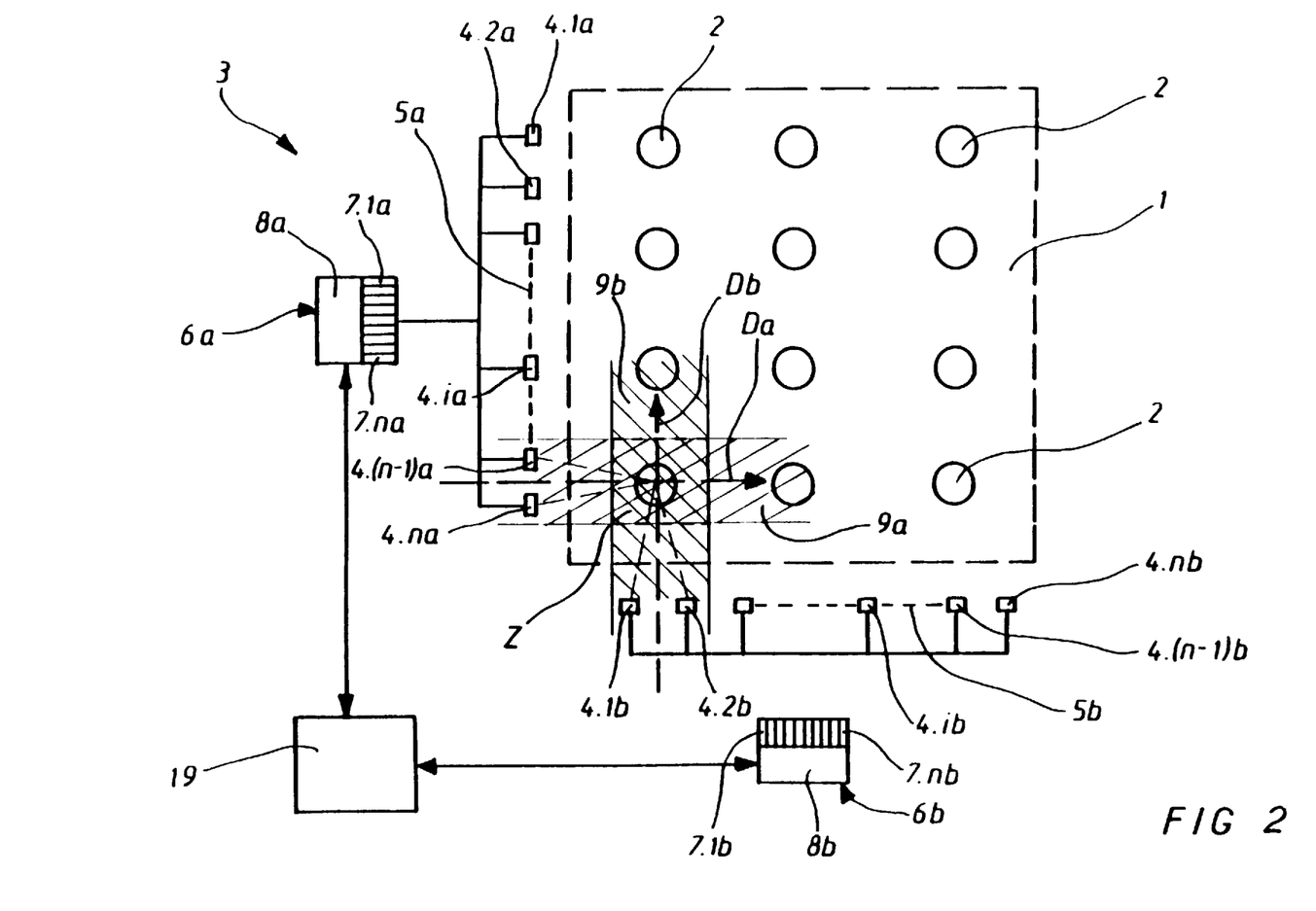
FIG. 2 shows such an area of land on which a detection device according to a second embodiment of the invention has been placed.

FIG. 2 shows an area of land 1 which contains a certain number of mines 2 which are buried.

According to the embodiment of the invention, the detection device 3 comprises acoustic transducers which are distributed along two converging lines 5a and 5b.

The transducers are numbered in the following manner:
4.1a, 4.2a, . . . 4.ia, . . . 4.na for line 5a.
4.1b, 4.2b, . . . 4.ib, . . . 4.nb for line 5b.

Each line of transducers is controlled by a specific electronic processing box 6a, 6b.

Each box 6a and 6b comprises, as above, processing bands (7.1a, . . . 7.ia, . . . 7.na and 7.1b, . . . 7.ib, . . . 7.nb) as well as a common control unit 8a or 8b.

The processing boxes 6a and 6b are connected to a common command module 19.

The operation of this alternative of the device is derived from that previously described with reference to FIG. 1.

After determining the optimal operational frequencies for each line of transducers, the command module 19 will firstly command the focusing by temporal reversal of the transducers in line 5a on a first mine. This first stage will lead to the definition of a location direction Da, defined as the mean perpendicular of the segment joining two transducers (preferably contiguous) and for which the signal propagation times are roughly equal.

In FIG. 2 the location direction Da which corresponds to the mean perpendicular between transducers 4.(n−1)a and 4.na is shown.

Then, the first line 5a being at rest, the command module 19 will command the focusing by temporal reversal of the transducers of the second line 5b on the same first mine.

A suitable temporal window will be chosen so as to be sure that focusing will effectively occur for the same mine. This choice will be made by means of an assessment of the actual distance between the first location direction Da and line 5b. The actual positions of the lines will be known by suitable means, associating, for example, inertial platforms, GPS (positioning in space by satellite) systems, range finders.

Once again transducers will be searched for on line 5b for which the signal propagation times are roughly equal, which will lead to the definition of a location direction Db, defined as the mean perpendicular of the segment joining these two transducers.

In FIG. 2 the location direction Db which corresponds to the mean perpendicular between transducers 4.1b and 4.2b is shown.

The theoretical location of mine 2 will be considered as the intersection of the two location directions Da and Db.

The mine is not obligatorily to be found at the intersection of direction Da and Db but is located in a zone Z which is the intersection of the bands 9.a and 9.b (hatched).

Each band is parallel to the direction Da or Db under consideration and is centered on the latter. The width of each band is equal to or double the distance separating the two transducers.

The advantage of this alternative is that it is no longer necessary to determine a propagation speed for the sound waves in the ground. The accuracy obtained is therefore greater.

The electronic processing boxes 6 which enable this process to be implemented are analogous to those described above with reference to FIG. 3.

So as to ensure the operational homogeneity of the different transducers a control unit 8 common to both lines of transducers can be, advantageously, selected for use, this part of the processing electronics will therefore be included in the command module 19.

A common computer will thus determine the different location directions and/or bands and will compute the locations of the different mines as being at the intersection of these directions and/or bands.

The connections between boxes 6a, 6b and the command module 19 could either be in wire form or could be made by radio or optical means.

Figure 4A:
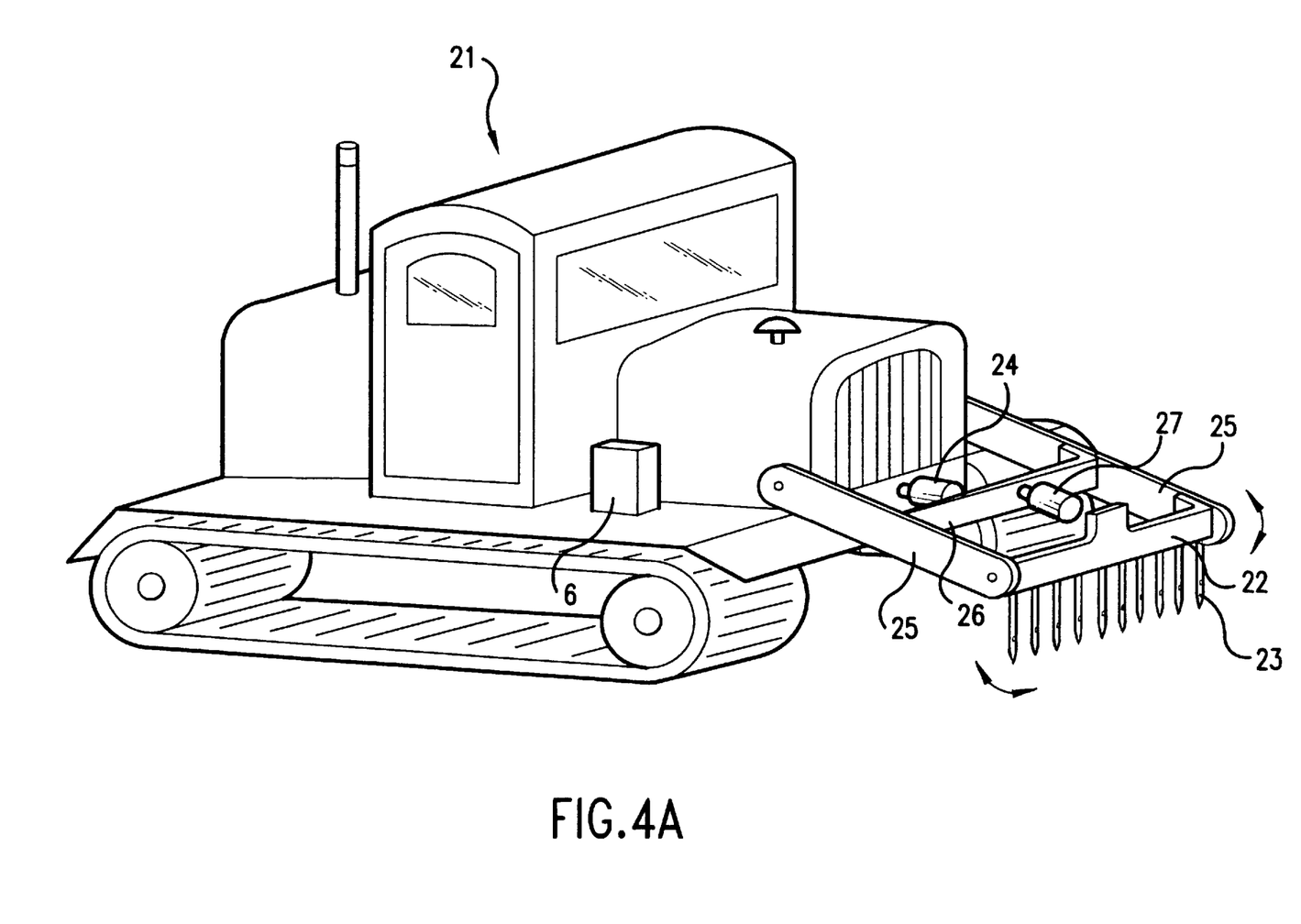
FIG. 4a shows a device according to a first embodiment mounted onto a vehicle.

FIG. 4a shows a tracked vehicle 21 which carries a ramp 22 on which supports 23.1,23.2, . . . 23.n, are fastened, in this example the supports are in the form of pegs. This ramp is shown on its own in FIG. 4b. Each peg 23.i carries a transducer 4.i. The pegs enable all the transducers to be positioned at the same depth in the ground.

Figure 4B:
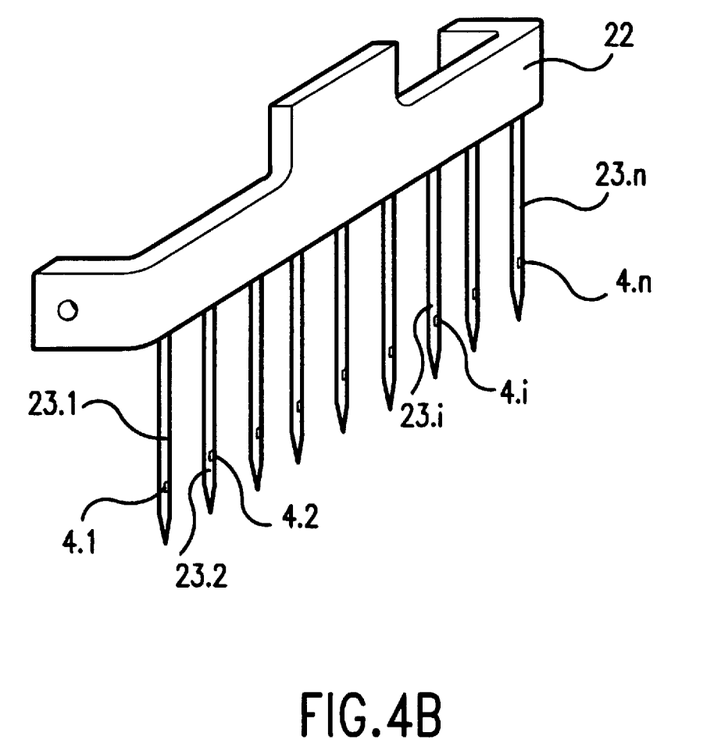
FIG. 4b shows the ramp used by the vehicle in FIG. 4a on its own.

The position of the ramp, and thus the position of the pegs in the ground, can be adjusted by means of a first jack 24 (hydraulic or electric) which enables the slope of the ramp support brackets 25 to be adjusted with respect to the vehicle 21.

This first jack is mounted between the vehicle and a race 26 integral with the bracket 25. A second jack 27 is positioned between the brace 26 and the ramp 22. It enables the ramp to be pivoted with respect to the brackets 22 and thus the penetration angle of the pegs 23 in the ground. Sensors, not shown, enable the position of the pegs with respect to the ground (angle and penetration depth) to be measured. The vehicle 21 carries the processing box 6 will maybe be connected by radio to a command module which, in that event, will contain part of the processing electronics.

By way of an alternative, the pegs can be replaced by supports which are not pushed into the ground but which enable the transducers to be positioned in contact with the ground.

Figure 5:
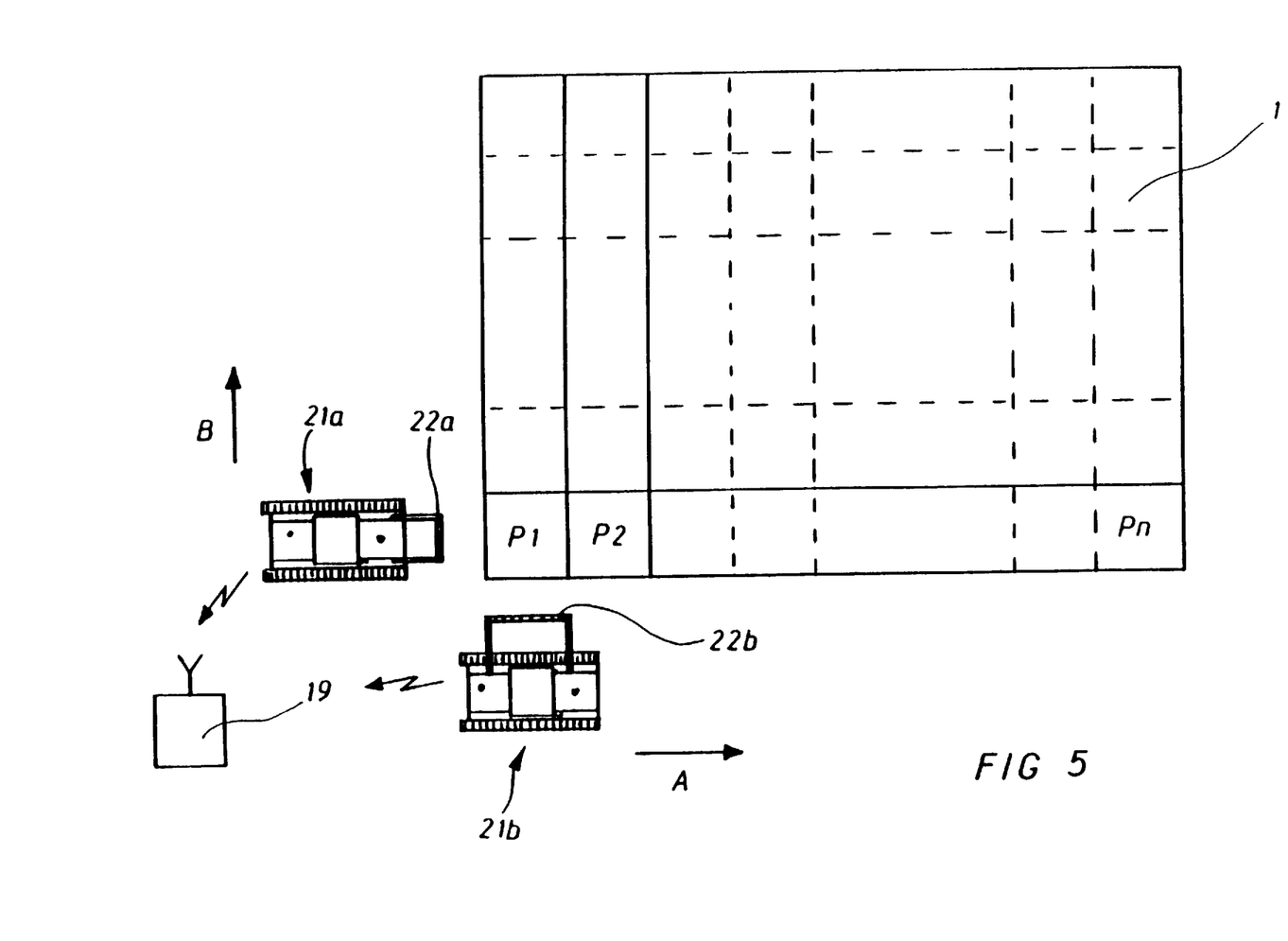
FIG. 5 shows in diagram form the implementation of the device according to the invention using two vehicles.

FIG. 5 shows the implementation in diagram form of the device according to the invention using two vehicles 21a and 21b.

Vehicle 21a is fitted with a ramp 22a on which the supports, such as pegs, carrying the transducers are fastened.

Vehicle 21b is fitted with a ramp upon which supports carrying transducers are also fastened.

The ramp 22a is arranged laterally with respect to the vehicle 21b (with a suitable assembly of brackets and jacks) and this in order to facilitate the advance of the vehicle along a direction A with a minimal number of maneuvers. It would naturally be possible to use an identical ramp assembly on both vehicles. The repositioning of each vehicle will be made easier by their being fitted with location means (inertial unit, GPS system).

Such an arrangement enables the process described above with reference to FIG. 2 to be implemented.

A very widespread area of land 1 will be explored by leaving vehicle 21a immobile and advancing vehicle 21b along direction A. Mines will thus be searched for one after the other in the adjacent parts of the area of land (P1,P2, . . . Pi, . . . Pn).

After processing all the parts Pi vehicle 21a will be moved along direction B in order to explore another part of the area 1.

The operations will be coordinated by the command module 19 which will preferably be connected by radio to each vehicle.

Figure 6:
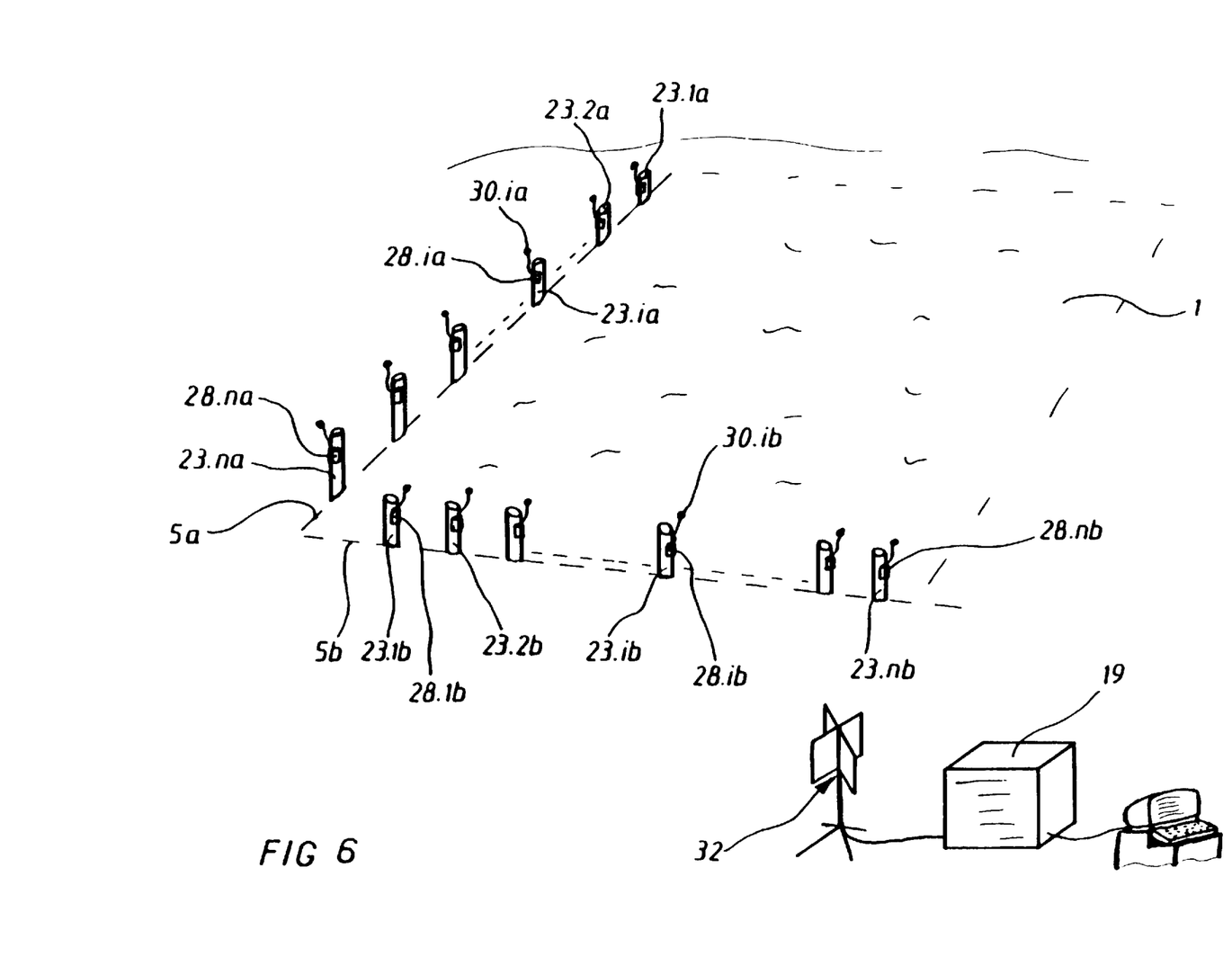
FIG. 6 shows a device according to another embodiment of the invention.
Figure 7:
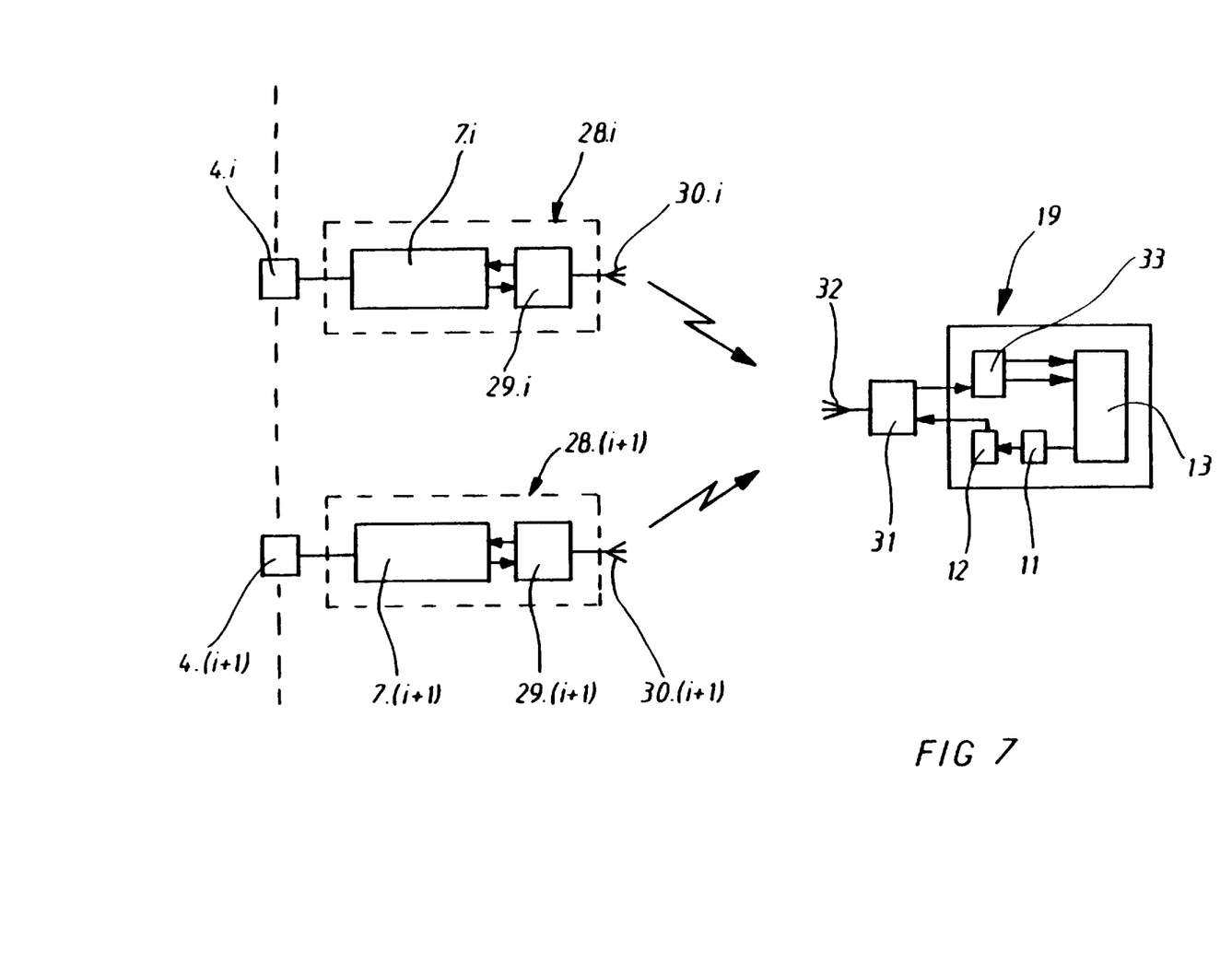
FIG. 7 is a flow chart of the electronics corresponding to another embodiment of the invention.

FIGS. 6 and 7 show a device according to another embodiment of the invention.

In this embodiment, the transducers are once again carried by supports in the form of pegs 23, but each peg is individually set into position on the area of land 1.

This area of land 1 has been surrounded by pegs 23 which are distributed along two converging lines. This embodiment of the invention also implements the process described with reference to FIG. 2.

The spacing of the different pegs was accurately measured when they were set into position.

Each peg 23.ia or 23.ib is fitted with a box 28.ia or 28.ib which contains the processing band 7.i associated with the transducer 4.i fitted onto the peg (refer also to FIG. 7).

The box 28.i also contains a radio emitter/receiver 29.i and is fitted with an antenna 30.I. The command module 19 is placed at a distance from the area of land 1. It also contains a radio emitter/receiver 31 coupled with an antenna 32.

The command module contains part of the processing electronics. It ensures the operation of the common control unit 8 described above with reference to FIG. 3. It therefore contains a clock 11, a rate setter 12 and a computer 13. The use of a common clock and rate setter as well as a radio link makes it possible to synchronize the emissions from the different transducers, even for a large number of the latter and over large distances.

A decoder 33 enables the radio data sent by the different pegs to be transformed into data able to be utilized by the computer.

As has been described above with reference to FIG. 2, the command module 19 will firstly carry out focusing by temporal reversal from a first line of transducers 5a and will then carry out a separate focusing from the second line of transducers 5b.

This embodiment of the invention enables large surface areas of land (over 10 m×10 m) to be processed in a single operation. However, the set up is longer, this embodiment is therefore better adapted to clean-up operations of battle zones after combat.

There again it is possible to use supports which are not pushed into the ground but which allow the transducers to be positioned in contact with the ground.

In all the embodiments of the invention described above, it will be possible, after detection of a mine, to cause its initiation or to move it, which can make it easier to spot afterwards further to the modification in the lie of the land which would ensue.

In order to do this, a great acoustic energy will be focused on the mine, by using the last memorized echo signals. A last signal, temporally returned, will be projected onto it but whose amplitude will be substantially amplified by means of a suitable power generator (for example, in a ratio of 1,000 to 100,000 according to the type, hard or soft, of the ground).

The invention has been described within the scope of its use to detect land mines. It is naturally applicable to the detection of sea mines, whether buried or not, or else to the detection of buried objects or to the registering of heterogeneities in the ground.

We claim:

1. A method for detecting objects dispersed in an area of land, comprising:

arranging a plurality of transducers along a boundary of the area;

determining an optimal operational frequency of a signal in accordance with a type of ground of the area, the optimal operational frequency being a frequency for which an amplitude of echo signals received by the plurality of transducers is at least a maximum for a majority of the plurality of transducers;

sending a brief, unfocused initial signal at the optimal operational frequency into the ground from at least one of the plurality of transducers;

recording with respect to time echo signals received from the ground and received by the plurality of transducers, a start time being the instant of sending the initial signal;

selecting, by setting at least one temporal window, echo signals coming from a first object located in the area;

focusing detection on the first object by making a preselected number of successive temporal reversals of signals emitted by the plurality transducers and storing an echo signal at the end of a last temporal reversal;

identifying at least two transducers for which propagation times of the signals are substantially equal;

determining at least one location direction, the location direction being a line in the vicinity of which the first object potentially lies and being defined as the mean perpendicular of a segment joining the at least two transducers;

determining the actual location of the first object along the at least one location direction; and repeating the above steps for each object to be detected.

2. The method according to claim 1, wherein the step of determining the actual location of the first object along the at least one location direction, comprises:

determining a position of the first object along the at least one location direction by calculating distances traveled by the echo signals received by the at least two transducers.

3. The method according to claim 1, wherein the step of arranging a plurality of transducers along a boundary of the area comprises arranging the transducers along at least two converging lines and wherein the step of determining the actual location of the first object comprises determining that the actual location is at an intersection of two location directions.

4. The method of claim 1, wherein the step of selecting, by setting a temporal window, echo signals coming from a first object located in the area, comprises:

comparing wave shapes of echo signals received by each of the plurality of transducers with a library of characteristic signatures of principal objects to be searched for; and selecting the first object to be processed and a temporal window in accordance with the comparison.

5. The method of claim 1, wherein the step of focusing detection on the first object by making a preselected number of successive temporal reversals of signals emitted by the transducers, comprises:

comparing wave shapes of the echo signals received by each of the plurality of transducers with a library of characteristic signatures of principal objects to be searched for to identify the first object.

6. The method of claim 1, wherein the step of determining an optimal operational frequency of a signal in accordance with a type of ground of the area, comprises:

emitting a signal having a variable, unfocused frequency from a source;

analyzing echo signals returned from the ground and received by the plurality of transducers according to the frequency of the signal emitted; and selecting as the optimal operational frequency the frequency for which an amplitude of the signals received by the plurality of transducers is at least a maximum for the majority of the plurality of transducers.

7. The method of claim 1, further comprising:

after locating the first object, sending at least one additional signal in a shape of the last recorded temporal reversal signal, the signal being amplified sufficient to make the first object move or vibrate.

8. A device for detecting objects dispersed in an area of land utilizing a plurality of transducers arranged along a boundary of the area, comprising:

means for determining an optimal operational frequency of a signal in accordance with a type of ground of the area;

means for sending a brief, unfocused initial signal at the optimal operational frequency into the ground;

means for recording with respect to time echo signals returned from the ground and received by the plurality of transducers, a start time being the instant of sending the initial signal;

means for selecting, by setting a suitable temporal window, echo signals coming from a first object located in the area;

means for focusing detection on the first object by making a preselected number of successive temporal reversals of signals emitted by the transducers and means for storing an echo signal at the end of a last temporal reversal;

means for locating at least two transducers for which propagation times of the signals are substantially equal;

means for determining at least one location direction, the location direction being a line in the vicinity of which the first object potentially lies and being defined as the mean perpendicular of a segment joining the at least two transducers; and means for determining the actual location of the first object along the location direction.

9. A device for detecting objects dispersed in an area of land as set forth in claim 8, further comprising:

the plurality of transducers communicatively connected to a processing device, wherein the transducers are each mounted to a support designed to be one of pushed into the ground and placed on top of the ground.

10. The device according to claim 9, wherein the supports are integral with at least one ramp fitted on at least one vehicle, the ramp being adjustable in order to allow the supports to be positioned with respect to the ground.

11. The device according to claim 9, wherein the transducers are arranged along at least one row in series.

12. The device according to claim 9, wherein the transducers are arranged along at least two rows arranged along converging lines.

13. The device according to claim 12, wherein the at least two rows of transducers arranged along converging lines are each carried by a different vehicle.

14. The device according to claim 10, wherein the supports can be installed individually on the land, and further comprising a radio link provided between each support and the processing device so as to allow synchronization of signals emitted by the plurality of transducers.

15. The device according to claim 10, wherein the transducers are spaced by an amount substantially equal to a size of the largest object to be detected.

* * * * *